July 4, 1967

V. I. MUKHO 3,329,229

ARRANGEMENT FOR MECHANICAL REMOTE GEAR CHANGE
CONTROL IN TILTING-CAB MOTOR VEHICLES
Filed Feb. 3, 1965

INVENTOR
VENIAMIN IVANOVICH MUKHO

United States Patent Office 3,329,229
Patented July 4, 1967

3,329,229
ARRANGEMENT FOR MECHANICAL REMOTE
GEAR CHANGE CONTROL IN TILTING-CAB
MOTOR VEHICLES
Veniamin Ivanovich Mukho, Minsk, U.S.S.R., assignor to Minsky Avtomobilny Zavod, Minsk, U.S.S.R.
Filed Feb. 3, 1965, Ser. No. 430,093
2 Claims. (Cl. 180—77)

This invention relates to gear change controls for motor vehicles, and more specifically to means for the mechanical remote control of gear boxes in motor vehicles of the tilting-cab type.

It has been known to use in tilting-cab motor vehicles remotely operating gear change control mechanisms in which the gear change control lever is mounted on the steering column of the vehicle and is connected to the gear selector mechanism through a linkage passing partly inside the steering column in the direct neighborhood of the steering linkage.

Gear change control mechanisms are also known in which the gear change control lever is mounted in the floor board of the tilting-cab, and the joint articulating the gear change lever to the vehicle chassis is situated on the axis of the cab pivot.

The principal disadvantage of the gear change control mechanisms in which the gear chance control lever is mounted on the steering column is that such mechanisms are too complex structurally and impose certain limits respecting the dimensions of the gear change control lever, and the last mentioned feature results in considerable physical effort on the part of the driver in making gear changes.

The gear change control mechanisms in which the gear change control lever is mounted in the cab floor board are objectionable in that their use presents difficulties in aligning one of the articulated joints thereof with the cab pivot axis.

This invention has for its object to provide a remote operating gear change control mechanism that will be suitable for tilting-cab motor vehicles, and be free of the disadvantages of the known mechanisms while permitting freedom of the constructional layout of the vehicle controls.

According to the present invention, the gear change control mechanism comprises a control lever articulated to the vehicle chassis and connected to the gear selector mechanism via a series of articulated levers and links, in which mechanism the joint articulating the control lever to the vehicle chassis is disposed rearwardly of the cab pivot axis, with the control lever support mounted in the cab floor board being so constructed as to permit relative movement of the control lever and the cab floor board.

The arrangement proposed herein for the mechanical remote control of gear boxes in tilting-cab motor vehicles meets the demands of present-day automotive engineering inasmuch as the comparatively simple design constituting the present invention ensures a convenient control of the gear box and enables standardized cabs to be employed thus essentially reducing the production costs.

In order that the present invention may be readily carried into effect, an embodiment thereof will now be described with reference to the accompanying drawings, wherein.

Figure 1:
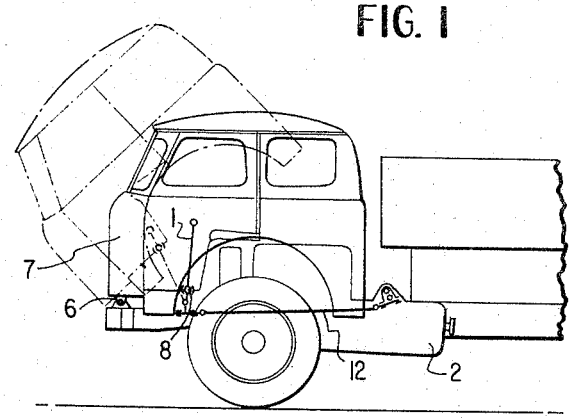
FIG. 1 is a diagrammatic view of the remote gear change control mechanism.

A gear change control lever 1 adapted to operate a gear box 2 is conveniently connected to chassis 3 of the vehicle through an intermediate articulated link 4 and a lever 5 which are disposed to the rear of an axis 6 about which a cab 7 pivots or swings.

Figure 3:
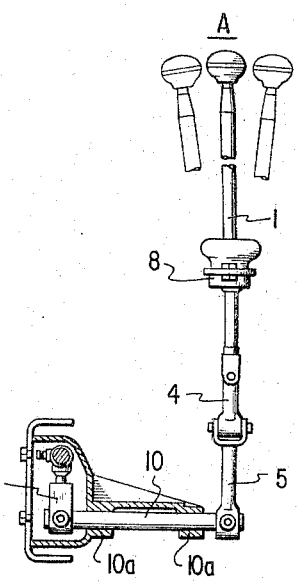
FIG. 3 is a view looking in the direction of the arrow A in FIG. 2.
Figure 2:
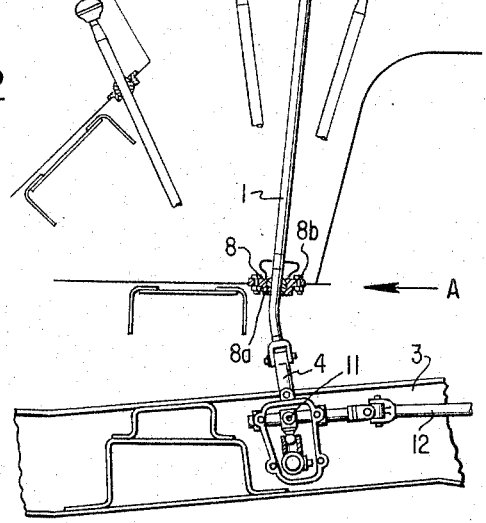
FIG. 2 is a fragmentary view partly in section and partly in elevation of same (side)
Figure 2:
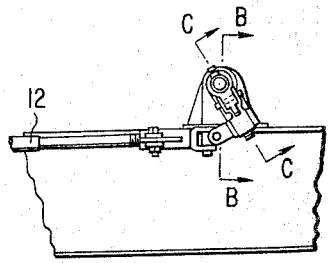
Figure 4:
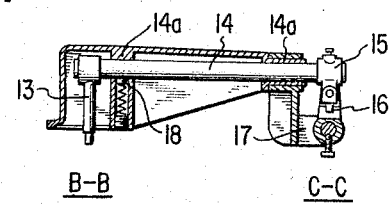
FIG. 4 is a view taken on the lines B—B and C—C of FIG. 2.

The articulated joints of the link 4 may be of a universal type, and in which case it is preferable to place the axes of rotation of the joints in mutually-perpendicular planes as shown in FIGS. 2 and 3.

The gear change control lever 1 is mounted to the vehicle chassis beneath the floor board of the cab 7 so as extend into the cab in a location convenient for the driver and to provide for adequate mounting of other vehicle controls. A support 8 is mounted in the cab floor board at the point through which the control lever extends, and is so constructed as to permit relative movement between the floor board and the control lever. FIGS. 1 and 2 show the relative positions of the floor board and the control lever 1, with the vehicle cab in a tilted position.

The support 8 is in the form of bearing having a ball 8a and a socket 8b, and the ball 8a is slidably mounted on the control lever 1.

When operated by the control lever, the lever 5 receives an angular motion and imparts such motion to a lever 9 through a shaft 10 supported in bearings 10a rigidly mounted in the chassis 3. The lever 9 is articulated to a longitudinally slidable member 11 which receives a reciprocating motion and transmits such motion through an articulated link 12 to a lever 13. The bearings 10a and shaft 10 define the connection between the lever 1 and the chassis 3.

The link 12 is adjustable lengthwise, and one of the ends of the link is adjustable for angular movement so as to be suitable for the use of universal joints. The lever 13 is affixed to one end of a shaft 14 rotatably supported in bearings 14a mounted on the casing of the gear box 2. The other end of shaft 14 carries lever 15 which engages a fork 16 mounted on a cranked pivot arm 17 connected to the gear selector mechanism. The shaft 14 is retained in a central position corresponding to the neutral position of the gear selector mechanism by a spring-loaded ball lock 18.

With the vehicle cab in the normal position, the remote control mechanism permits gear changes to be effected by moving the control lever 1 in two mutually perpendicular planes, namely, planes parallel and perpendicular to the longitudinal axis of the vehicle. The tilting or pivoting of the cab causes the control lever 1 to turn relative to the articulated link 4, with the support 8 sliding over the control lever. This relative movement of the control lever 1 and support 8 precludes the possibility of the control lever affecting the remote control mechanism and enables the cab to be tilted to a sufficiently large angle.

The invention is not to be confined to any strict conformity to the showings in the drawings but changes or modifications may be made therein so long as such changes or modifications mark no material departure from the spirit and scope of the appended claims.

What is claimed is:

1. In a tilt-cab motor vehicle provided with a chassis, a gear box carried by the chassis, a cab having a floor board, means pivotally mounting the cab on the chassis, a gear change control lever in the cab for controlling the gear box and means operably connecting the control lever with the gear box, said connecting means including joint means located rearwardly of the means pivotally mounting the cab on the chassis operably related to the control lever for articulating the control lever to the chassis, a support for the control lever mounted in the floor board of cab providing for relative movement between the control lever and floor board and linkage means interconnecting the joint means and gear box whereby manipulation of the control lever effects gear changes of the gear box.

2. The arrangement as claimed in claim 1 in which said support includes a ball and socket bearing with the ball thereof being slidably mounted on the control lever.

References Cited

UNITED STATES PATENTS

| 1,469,579 | 10/1923 | Borden | 74—473 X |
| 2,168,645 | 8/1939 | Glidden | 74—473 |
| 2,569,341 | 9/1951 | Schjolin | 74—473 X |
| 2,694,943 | 11/1954 | Brumbaugh | 74—473 |
| 2,854,088 | 9/1958 | Dence | 180—77 |
| 2,951,393 | 9/1960 | Schroeder et al. | 74—473 |

MILTON KAUFMAN, *Primary Examiner.*